United States Patent [19]

Shoup

[11] Patent Number: 5,767,765
[45] Date of Patent: Jun. 16, 1998

[54] MOTION DETECTION SYSTEM

[76] Inventor: David T. Shoup, 167 Elk Trail #165, Carol Stream, Ill. 60188

[21] Appl. No.: 782,738

[22] Filed: Jan. 13, 1997

[51] Int. Cl.[6] .................................................. B60Q 1/00
[52] U.S. Cl. ...................... 340/425.5; 340/935; 340/942; 180/168
[58] Field of Search ............................ 340/425.5, 933, 340/935, 942; 180/167, 168, 169

[56] References Cited

U.S. PATENT DOCUMENTS

| | | | |
|---|---|---|---|
| 2,048,740 | 7/1936 | Geffcken et al. | 340/942 |
| 2,400,489 | 5/1946 | Dana et al. | 340/942 |
| 3,109,157 | 10/1963 | Bolton | 340/933 |
| 4,549,182 | 10/1985 | Gillet | 340/942 |
| 5,392,034 | 2/1995 | Kuwagaki | 340/933 |

*Primary Examiner*—Jeffery Hofsass
*Assistant Examiner*—Nina Toug
*Attorney, Agent, or Firm*—Meroni & Meroni

[57] ABSTRACT

The motion detection system of the present invention includes a pair of signal reflectors positioned at a defined location for directing signals into the path of travel of an object. A corresponding pair of signal detecting devices positioned on the moving object detects the signals and produces responsive electrical signals. An electrical circuit is connected to receive these electrical signals and to provide an electrical output indicative of the direction of travel of said object.

6 Claims, 3 Drawing Sheets

MOTION DETECTION SYSTEM

BACKGROUND OF THE INVENTION

1. Field of the Invention

This invention relates generally to systems for detecting movement of objects. More particularly, this invention relates to means for detecting the proximity and direction of travel of a vehicle entering or exiting a defined aisle.

2. Description of the Prior Art

In the prior art, the movement of vehicles in and out of warehouse aisles has not been monitored, and warnings of such movement have not been provided. The need for an automated sensing and warning system has been recognized as a safety precaution which could prevent accidents, yet heretofore no system has been developed to efficiently provide such a warning.

SUMMARY OF THE INVENTION

It is accordingly the object of the present invention to provide a system for detecting the proximity of an object, such as a vehicle, and its direction of travel as it reaches a defined location, such as the end of an aisle.

The system of the present invention includes a pair of signal emitting/reflecting sources positioned at a defined location, for directing signals into the path of travel of the object. A corresponding pair of signal detecting devices positioned on the moving object detects the emitted signals and produces responsive electrical signals. An electrical circuit is connected to receive these electrical signals and to provide an electrical output indicative of the direction of travel of said object. In the preferred embodiment, dual light emitting sources are mounted on the moving object along with corresponding photodetectors. Dual reflectors are positioned in spaced relation at the defined location to reflect the light beams to the photodetectors and thereby to provide both proximity and directional information to the circuit.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
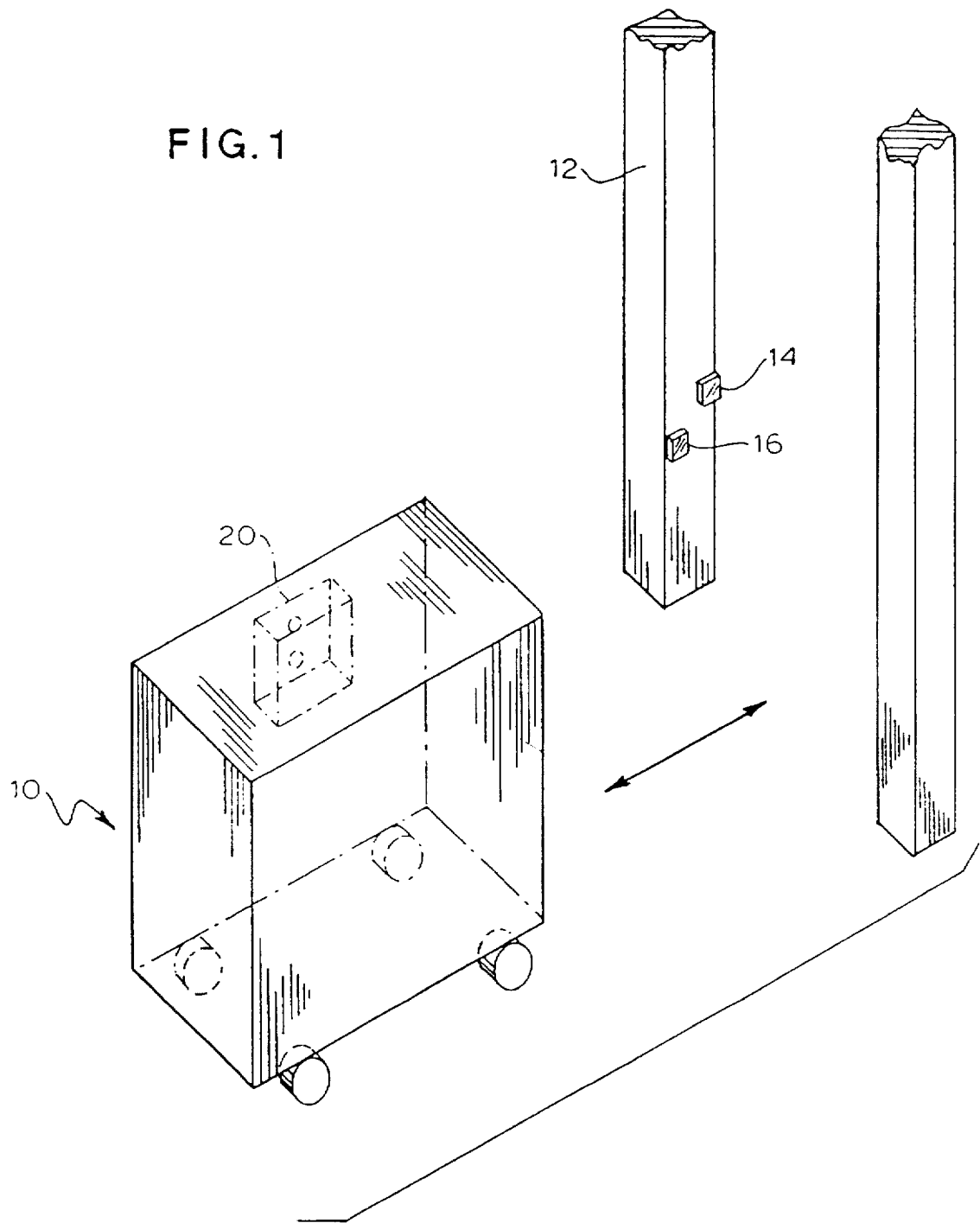
FIG. 1 is a perspective view of a vehicle moving past a defined end-of-aisle position and employing the detection system of the present invention.
Figure 2:
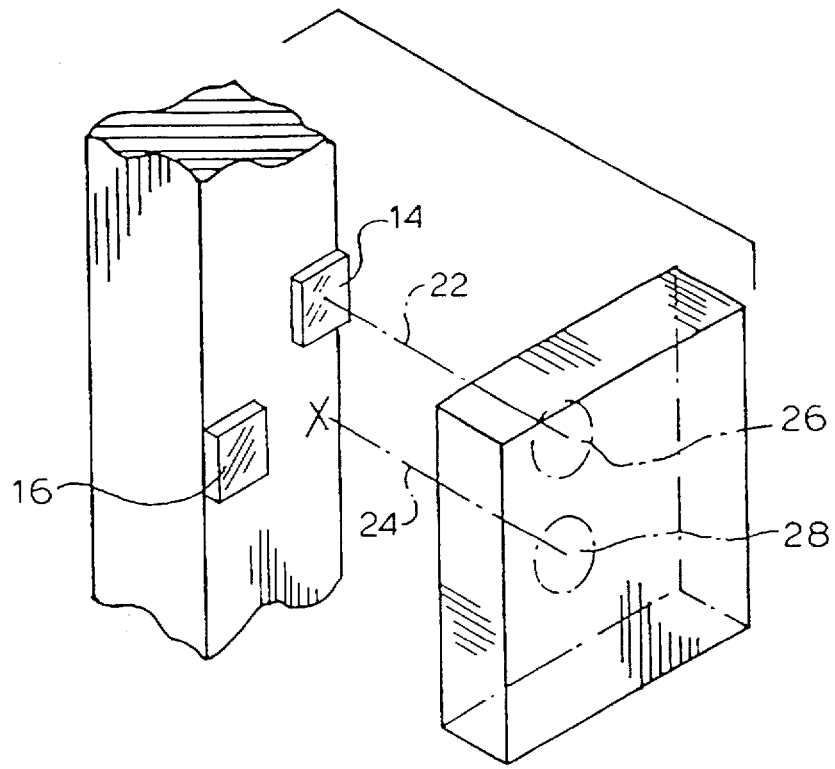
FIG. 2 is a detail view of the sensor portion of FIG. 1 showing the reflectors positioned to reflect the top light beam to a photodetector.
Figure 3:
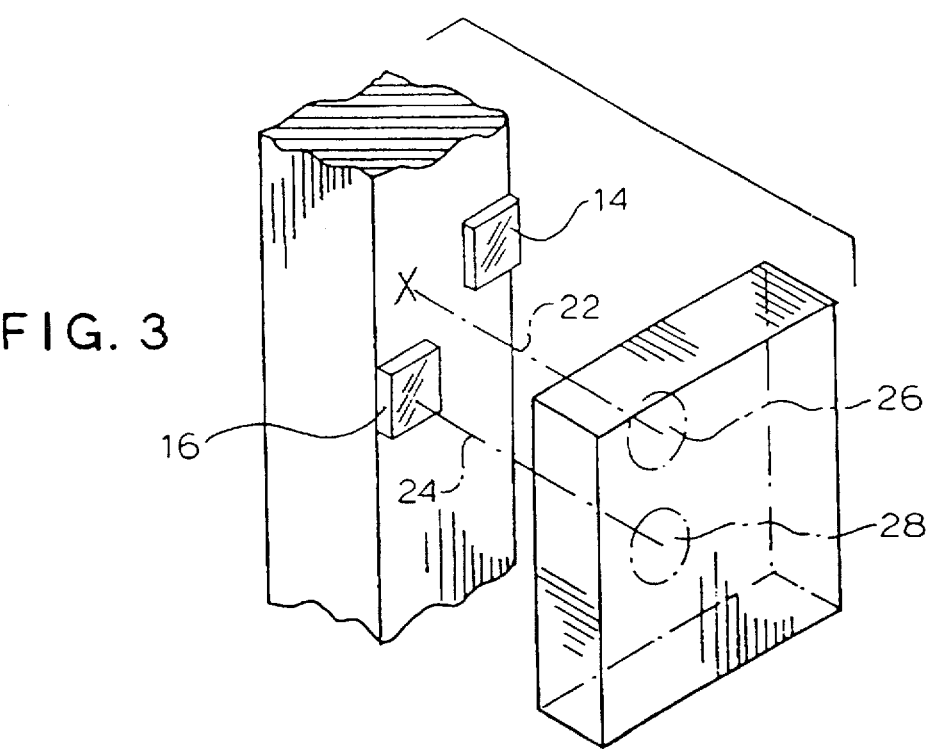
FIG. 3 is a detail view of the sensor portion of FIG. 1 showing the reflectors positioned to reflect the bottom light beam to a photodetector.

Turning first to FIG. 1 there is shown a vehicle 10 poised to move past a defined location employing a post 12 having light beam reflectors 14 and 16 positioned thereon. Motion detection circuitry is provided in a unit 20 mounted on the vehicle, which unit generates an upper light beam 22 (FIGS. 2 and 3) and a lower light beam 24. These beams are reflected back to the emitting/detecting units 26 and 28 by means of the upper reflector 14 and lower reflector 16. By spacing the reflectors apart horizontally and vertically, and aligning the light beam emitting/detecting units vertically, the top reflector will cause detection of the top light beam by the top photodetector when the bottom detector fails to detect a light beam (FIG. 2). Similarly, the bottom reflector will cause the bottom detector to detect a reflected light beam when the top detector fails to detect a light beam (FIG. 3). Consequently, from an initial state with no light beams being detected, if the top detector senses a beam first (FIG. 2), the vehicle is near the defined location and moving in a known direction (from right to left in the drawings). However, if the bottom detector senses a light beam first (FIG. 3) the vehicle is proximate the defined location and moving from left to right.

Figure 4:
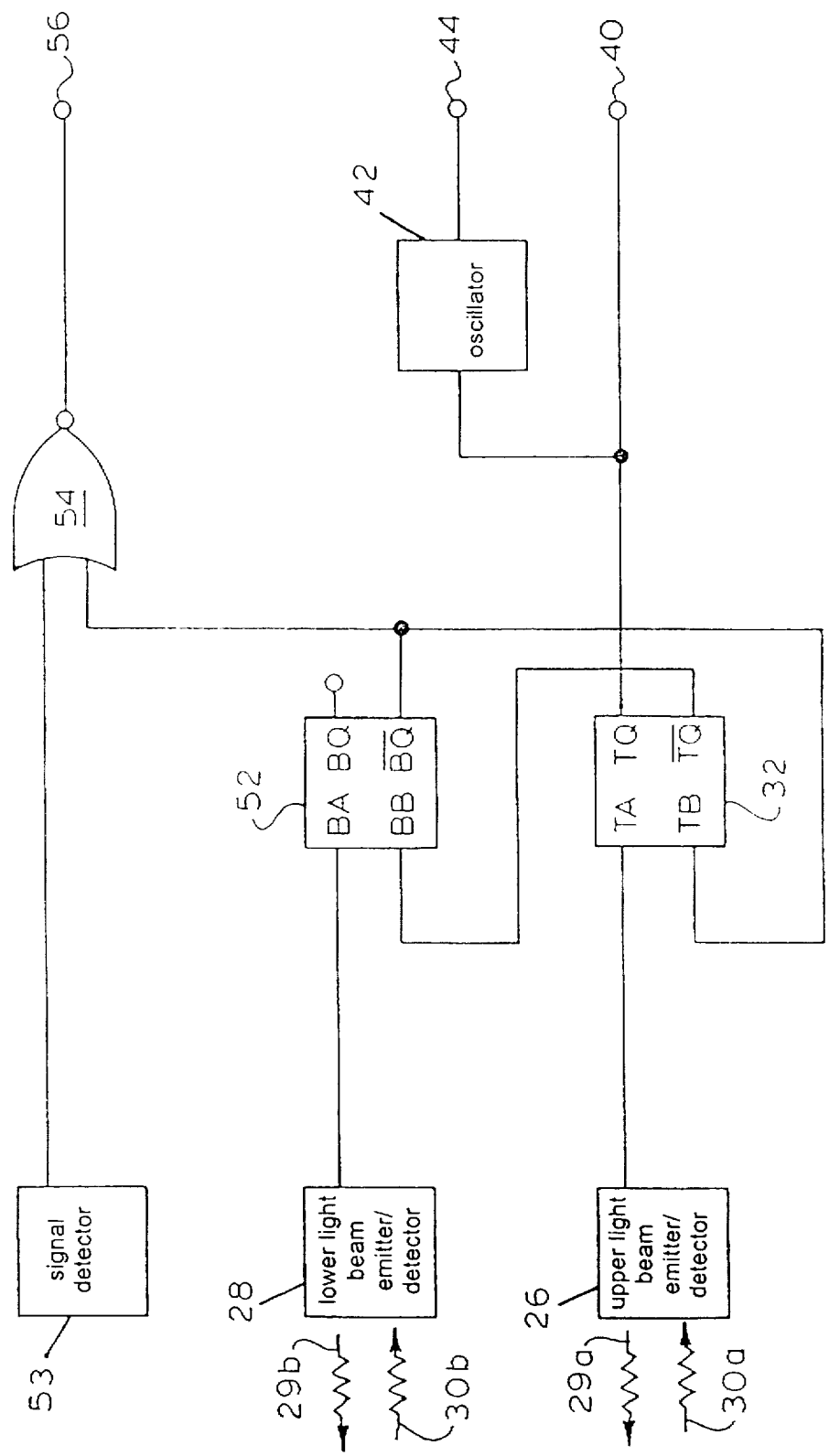
FIG. 4 is a schematic of the circuitry employed to detect the proximity and direction of the vehicle of FIG. 1.

Turning to FIG. 4, these is shown a schematic of the circuitry employed with the present invention. Upper and lower light beam emitter/detectors, 26 and 28, are commercially available devices which emit a light beam (29a and 29b) and produce an electrical signal output in response to a received light beam signal. When the top photodetector 26 senses a reflected light beam 30a from the top reflector, a positive voltage signal is applied to the trigger input of the "one-shot" circuit device 32. This top "one-shot" 32 provides a responsive timed positive voltage pulse at its TQ output and a corresponding negative pulse at its $\overline{TQ}$ output. The TQ output (indicating a certain direction of travel) is then provided to the circuit output 40 as well as to an oscillator 42 to also provide an oscillating output at circuit output 44. The $\overline{TQ}$ output of the top "one-shot" 32 is fed to the BB input of the bottom "one-shot" 52 to disable subsequent activation of the bottom "one-shot" and indicate that the top detector was activated first.

The bottom light beam emitter/detector 28 similarly provides a signal output to the bottom "one-shot" circuit device 52 when a light beam 30b is reflected from the bottom reflector. This triggering signal from the bottom detector 28 to the input BA of the bottom "one-shot" will, unless this "one-shot" is disabled, cause the $\overline{BQ}$ output to produce a negative voltage pulse for a predetermined time. This negative signal which indicates that the bottom detector was activated first is fed to the TB input of the top "one-shot" 32, to disable it for the preset time. The BQ output can be used to signal motion in a second direction, if desired.

A signal detector 53 for sensing either electrical or electromagnetic signals, commonly known in the art, is arranged to sense the presence or absence of a remote control signal and to provide a positive voltage signal to one input of a NOR logic device 54. A second input to the NOR device 54 is connected to the $\overline{BQ}$ output of the bottom "one-shot" 52. Consequently, when a remote control signal is not present and the bottom photodetector 28, sensing movement in a predetermined direction, activates the bottom "one-shot" 52, a responsive signal is provided at circuit output 56.

Of the circuit outputs, output 40 is used to activate an alarm indicating arrival at the defined location (end of aisle) from a specific approach direction. (Similarly, output BQ of the bottom "one-shot" can be used to indicate approach from the opposite direction.) The output 44 is available to strobe a horn or light in conjunction with output 40. Output 56 provides a signal enabled when the vehicle reaches the defined location, such as entering an aisle, with the circuit detecting the absence of guidance control. This output 56 can be used to activate an alarm or apply automatic brakes.

From the foregoing description, it will be apparent that modifications can be made to the apparatus and method for using same without departing from the teachings of the present invention. Accordingly, the scope of the invention is only to be limited as necessitated by the accompanying claims.

What is claimed is:

1. A system for sensing the direction of travel of a moving object along a path, past a location, comprising:

a pair of signal means including light beam reflectors positioned vertically and horizontally spaced apart at said location for directing signals into the path of travel of said object;

a corresponding pair of signal detecting devices including light beam sources positioned vertically spaced apart on said moving object for detecting said signals and producing responsive electrical signals; and direction circuit means connected to receive said electrical signals and to provide an electrical output indicative of the direction of travel of said object.

2. The system of claim 3 wherein said circuit means includes one-shot electrical devices connected to said signal detecting devices for generating a respective timed pulses in response to respective signal detection.

3. The system of claim 2 further comprising means for sensing the absense of control signals and for providing a defined electrical output in response thereto when said direction circuit means indicates a predetermined direction of travel.

4. A system for sensing the direction of travel of a vehicle entering or leaving a defined aisle, comprising:

a pair of signal means including light beam reflectors positioned vertically and horizontally spaced apart at said aisle for directing signals into the path of travel of said vehicle;

a corresponding pair of signal detecting devices including light beam sources positioned vertically spaced apart on said vehicle for detecting said signals and producing responsive electrical signals; and direction circuit means connected to receive said electrical signals and to provide an electrical output indicative of the direction of travel of said vehicle.

5. The system of claim 4 wherein said circuit means includes one-shot electrical devices connected to said signal detecting devices for generating a respective timed pulses in response to respective signal detection.

6. The system of claim 5 further comprising means for sensing the absence of control signals and for providing a defined electrical output in response thereto when said direction circuit means indicates a predetermined direction of travel.

* * * * *